United States Patent [19]
Kanjo

[11] Patent Number: 6,043,449
[45] Date of Patent: Mar. 28, 2000

[54] SPOT WELDING SYSTEM AND SPOT WELDING METHOD AND NUGGET DIAMETER ESTIMATION SYSTEM AND NUGGET DIAMETER ESTIMATION METHOD

[75] Inventor: Mitsunori Kanjo, Kanagawa-ken, Japan

[73] Assignee: Nissan Motor Co., Ltd., Kanagawa-ken, Japan

[21] Appl. No.: 09/140,316

[22] Filed: Aug. 26, 1998

[30] Foreign Application Priority Data

Aug. 27, 1997 [JP] Japan ..................................... 9-231063

[51] Int. Cl.[7] ............................. B23K 11/11; B23K 11/25
[52] U.S. Cl. ............................................ 219/109; 219/91.1
[58] Field of Search .............................. 219/86.41, 86.51, 219/91.1, 86.1, 108, 109, 110; 364/477.06; 700/212

[56] References Cited

U.S. PATENT DOCUMENTS

| | | |
|---|---|---|
| 3,400,242 | 9/1968 | Waller . |
| 4,541,277 | 9/1985 | Cecil . |
| 5,194,709 | 3/1993 | Ichikawa et al. ........................ 219/109 |
| 5,343,011 | 8/1994 | Fujii et al. ............................... 219/109 |
| 5,575,934 | 11/1996 | Takakuwa et al. ...................... 219/109 |

FOREIGN PATENT DOCUMENTS

| | | |
|---|---|---|
| 48-41422 | 12/1973 | Japan . |
| 53-4057 | 2/1978 | Japan . |
| 5-228647 | 9/1993 | Japan . |
| 7-232279 | 9/1995 | Japan . |

*Primary Examiner*—Gregory Mills
*Attorney, Agent, or Firm*—McDermott, Will & Emery

[57] ABSTRACT

A welding spot is held between electrodes either biased with a controlled pressure, having a controlled voltage applied thereacross, and variations of an inter-electrode distance are detected for a welding quality control, in which the distance variations are time-integrated, a nugget size is estimated on a basis of the integration, and a decision is made of a conformity of welding quality based on an estimated nugget size.

37 Claims, 11 Drawing Sheets

SPOT WELDING SYSTEM AND SPOT WELDING METHOD AND NUGGET DIAMETER ESTIMATION SYSTEM AND NUGGET DIAMETER ESTIMATION METHOD

BACKGROUND OF THE INVENTION

The present invention generally relates to a spot welding. More specifically, the invention relates to a spot welding system and a spot welding method in which an estimation is made of a size of "a weld zone once melted upon a current conduction at a welding spot under an exerted welding pressure, and solidified thereafter" (hereafter called "nugget") and an estimated nugget size is employed as a base for a control on a quality of a weld at the spot, as well as to a nugget diameter estimation system and a nugget diameter estimation method applicable to such a spot welding system and a spot welding method.

FIG. 1 illustrates a typical nugget in a section of a welding spot.

Two base metal sheets 101, 102, lapped either on the other, are held with forces between stationary and movable electrode 104, and subjected to a welding current conducted therethrough, whereby they 101, 102 are heated, and start swelling in bulk, while melting from a central region of a welding spot W.

In cases such as of an excessive welding current, a deficient holding force and/or an insufficient preparation of a base metal surface, a body of molten metal may spatter outside or between the base metal sheets 101, 102, forming a surface flash 106 or as an expulsion 105, respectively, having a blow hole 107 left in a nugget N.

A finish of current conduction is followed by a contraction of the base metal sheets 101, 102 that gives final dimensions of a size of the nugget N, e.g. an outside diameter Nd and a thickness Nt thereof. The nugget diameter Nd may be deemed as an inside diameter of a corona bond 108 that is a pressure welded portion around the nugget N. After the contraction, the base metal sheets 101, 102 may have a slight sheet separation 109 incurred therebetween or an indentation 110 left as a trace of pressed electrode on a base metal surface. Non-conforming welding conditions may cause a pickup 111 or pit 112.

It is known to observe such developments in growth of nuggets for utilization to a quality control of a spot welding.

U.S. Pat. No. 4,542,277 discloses an apparatus for observing developments in growth of nuggets in terms of a displacement of an electrode to base a decision of a welding quality on a maximum displacement of the electrode, while suggesting a general usefulness of a computer processing of data on developments in growth of nuggets.

Japanese Patent Publication No. 48-41422 and Japanese Patent Publication No. 53-4057 compare a maximum variation of an inter-electrode distance with a reference variation, for a decision on a sureness of a weld at a welding spot.

Further, the Japanese Patent Publication No. 53-4057 as well as U.S. Pat. No. 3,400,242 compares a varying rate of an inter-electrode distance due to an expansion of a welding spot within a predetermined time interval, i.e. an expanding rate, with a reference varying rate for a decision on a welding sureness.

Japanese Patent Application Laid-Open Publication No. 7-232279 compares a time for a decrement of an inter-electrode distance due to a contraction of a welding spot, i.e. a contracting rate, with a reference time for a decision on a welding sureness.

The use of an instantaneous value, such as a maximum displacement or maximum variation, observed as a criterion for a decision permits the decision to be efficiently performed at a level where one can neglect developments of nugget growth before and after a point of time for the observation.

The use of a so-called 'differential value' within a predetermined time interval, such as an expanding rate or contracting rate, as a criterion for a decision permits the decision to be efficiently performed at a level allowing for considerations to a linear development of nugget growth within an associated observation time.

However, for decisions to be higher in accuracy and/or quick in response, e.g. for those in a robot line for spot-welding automobile bodies, their criteria sometimes need a level at which a non-linear development of nugget growth should also be taken into consideration.

SUMMARY OF THE INVENTION

The present invention has been achieved with such points in view.

It therefore is an object of the invention to provide a spot welding system and a spot welding method that permit a decision to be performed on a welding quality at a level having a non-linear development of nugget growth to be taken into consideration, as well as a nugget diameter estimation system and a nugget diameter estimation method that are applicable to such a spot welding system and a spot welding method.

To achieve the object, an aspect of the invention provides a spot welding system comprising a first and a second electrode adaptive for a relative advancement to each other to hold therebetween a welding spot of a work and for a relative retreat from each other to set free the welding spot, a mechanism for biasing either electrode of the first and the second electrode with a controlled pressure in a direction in which the either electrode makes the relative advancement, a power supply for supplying a controlled voltage between the first and the second electrode, a detector for detecting a variation of a distance between the first and the second electrode, and a controller for controlling a welding quality of the welding spot on a basis of the detected variation of the distance, the controller comprising an integrator for determining a time integration of a variant representative of the distance, an estimator for estimating a size of a nugget of the welding spot on a basis of the time integration, and a decision-maker for making a decision on a conformity of the welding quality on a basis of an estimated size of the nugget.

According to this aspect of the invention, at least either of first and second electrodes is caused, e.g. driven with a piston of a cylinder mechanism having fluid pressures acting thereon, to advance relative to the other to hold therebetween a welding spot of a work or relatively retreat to set free the welding spot. While the welding spot is held between the electrodes, there is operated a mechanism for biasing the either electrode with a controlled pressure in a direction in which the electrode relatively advances, as described, when a power supply supplies a controlled voltage between the electrodes, conducting a welding current through the welding spot, generating a quantity of Joule's heat in dependence on a magnitude of the current and internal and contact resistances of the welding spot, whereby the welding spot is heated from inside, expanding and melting, having a growing nugget. The expanding welding spot has a reaction force acting on the biasing mechanism, standing against the controlled pressure, forcing the biased electrode to retreat relative to the other electrode, so that a distance between the electrodes increases in a corresponding manner. The conduction of current is interrupted, as necessary, and contrary to the state under current conduction it so follows that the welding spot contracts, having a gradually solidifying nugget, with a corresponding decrease in distance between the electrodes.

Such variations in distance between the electrodes are detected by a detector, and detected distance variations are processed in a controller, e.g. by a set of program files, for controlling a welding quality of the welding spot in accordance with results of the processing.

On the way of such a processing for control, there is determined an integration of a variant representative of the distance between the electrodes over an adequate time interval. This time integration of the distance-representative variant is employed as a basis, such as an explanation variable to be processed in a multivariate analysis, for estimating a size of a nugget of the welding spot, and an estimated nugget size is based on to make a decision on a conformity of the welding quality.

Therefore, according to this aspect, there is covered a non-linearity of a nugget growth in the integration interval, as well as a linearity thereof. The covered nonlinearity may be of any and all factors associated with or derived from the developments of nugget growth described with reference to FIG. 1, allowing for a decision on the welding quality at a corresponding high level.

Moreover, the variant to be integrated is representative of the distance between the electrodes and hence of a variation thereof, and permits the integration to pick up any and all non-linear components due to non-linear factors associated with actions of the electrodes, such as a distortion of each electrode and a varying fluid pressure in the biasing mechanism, in addition to those due to a sheet separation, indentation, etc.

In this respect, FIG. 2 illustrates an essential portion of a spot welding machine applicable to the invention. The machine has a pair of upper and lower electrodes E1, E2 for holding therebetween a welding spot W of a work. The upper electrode E1 is fixed to a vertical rod Pr of a biasing piston P, which is slidably fitted in a hydraulic or pneumatic cylinder C connected via a fluid valve V to an unshown common compressor. The lower electrode E2 is fixed to a support Sp standing on an arcuate arm A of a holder member H. When the welding spot is held with a biasing force acting thereon from the piston P, the arm A slightly bends downward, constituting a non-linear factor of an interelectrode distance between the upper and lower electrodes E1, E2. The biasing force itself depends on a fluid pressure exerted on the piston P, while the pressure has uncontrollable minute variations, due such as to an uneven distribution from the common compressor and localized irregular streams in the cylinder C, giving rise to a non-linear component in a detected inter-electrode distance. According to the aspect described, such and other non-linear components can be all picked up to be taken into consideration for a decision on a conformity of a welding quality of the welding spot W.

According to another aspect of the invention, the integrator makes the time integration over an integration interval covering a time interval in which the welding spot expands, as it is heated with a welding current conducted therethrough.

According to this aspect, a decision of a welding quality can be performed in consideration of a non-linear factor associated with an expansion of a welding spot.

According to another aspect of the invention, the integrator makes the time integration over an integration interval covering a time interval in which the welding spot contracts, as a welding current is interrupted.

According to this aspect, a decision of a welding quality can be performed in consideration of a non-linear factor associated with a contraction of a welding spot.

According to another aspect of the invention, the integrator makes the time integration over an integration interval covering an adequate one of time intervals, as they are preset to kinds of combinations of welding conditions of the welding spot in a one-to-one corresponding manner.

According to this aspect, a well-considered decision of a welding quality can be performed in accordance with a difference of a respective one of various welding conditions of a welding spot.

According to another aspect of the invention, the estimator has a linear first model representing the size of the nugget, and the first model includes the time integration as a model element thereof.

According to this aspect of the invention, an integrated value over a time interval can be processed as a linear element, although the integration contains a non-linear variation of distance.

According to another aspect of the invention, the estimator further has a second model for evaluating an error of the first model.

According to this aspect of the invention, there is an enabled evaluation with respect to an error of a mathematical model representing a size of a nugget, allowing for a correction of the model for a better evaluation.

According to another aspect of the invention, the first model is representative by a recurrence formula for a multivariate analysis of the size of the nugget.

According to this aspect of the invention, a nugget size constitutes an object variable of a recurrence formula, and a time integration of a variant constitutes one of explanation variables thereof.

According to another aspect of the invention, the recurrence formula includes as explanation variables thereof an amplitude and a conduction time of the welding current, and the controlled pressure.

According to another aspect of the invention, the welding spot comprises a pair of plate members, and the recurrence formula includes as explanation variables thereof a plate thickness, a material, a joining pattern and a surface preparation of the plate members.

According to another aspect of the invention, the model element has a correction factor in consideration of one of a relationship between an expansion and a contraction of the welding spot and an effect of a spattering of the welding spot.

According to any of these three aspects, an added consideration permits the better decision.

Moreover, to achieve the object described, another aspect of the invention provides a spot welding method comprising the steps of having a first and a second electrode making a relative advancement to each other to hold therebetween a welding spot of a work, biasing either electrode of the first and the second electrode with a controlled pressure in a direction in which the either electrode makes the relative advancement, supplying a controlled voltage between the first and the second electrode, detecting a variation of a distance between the first and the second electrode, and controlling a welding quality of the welding spot on a basis of the detected variation of the distance, the controlling step comprising determining a time integration of a variant representative of the distance, estimating a size of a nugget of the welding spot on a basis of the time integration, and making a decision on a conformity of the welding quality on a basis of an estimated size of the nugget.

Still another aspect of the invention provides a nugget diameter estimation system comprising an integrator for determining a time integration of a variant representative of a distance between electrodes having a welding spot held therebetween under pressure, and an estimator for estimating a diameter of a nugget of the welding spot on a basis of the time integration.

Yet another aspect of the invention provides a nugget diameter estimation method comprising the steps of determining a time integration of a variant representative of a distance between electrodes having a welding spot held therebetween under pressure, and estimating a diameter of a nugget of the welding spot on a basis of the time integration.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
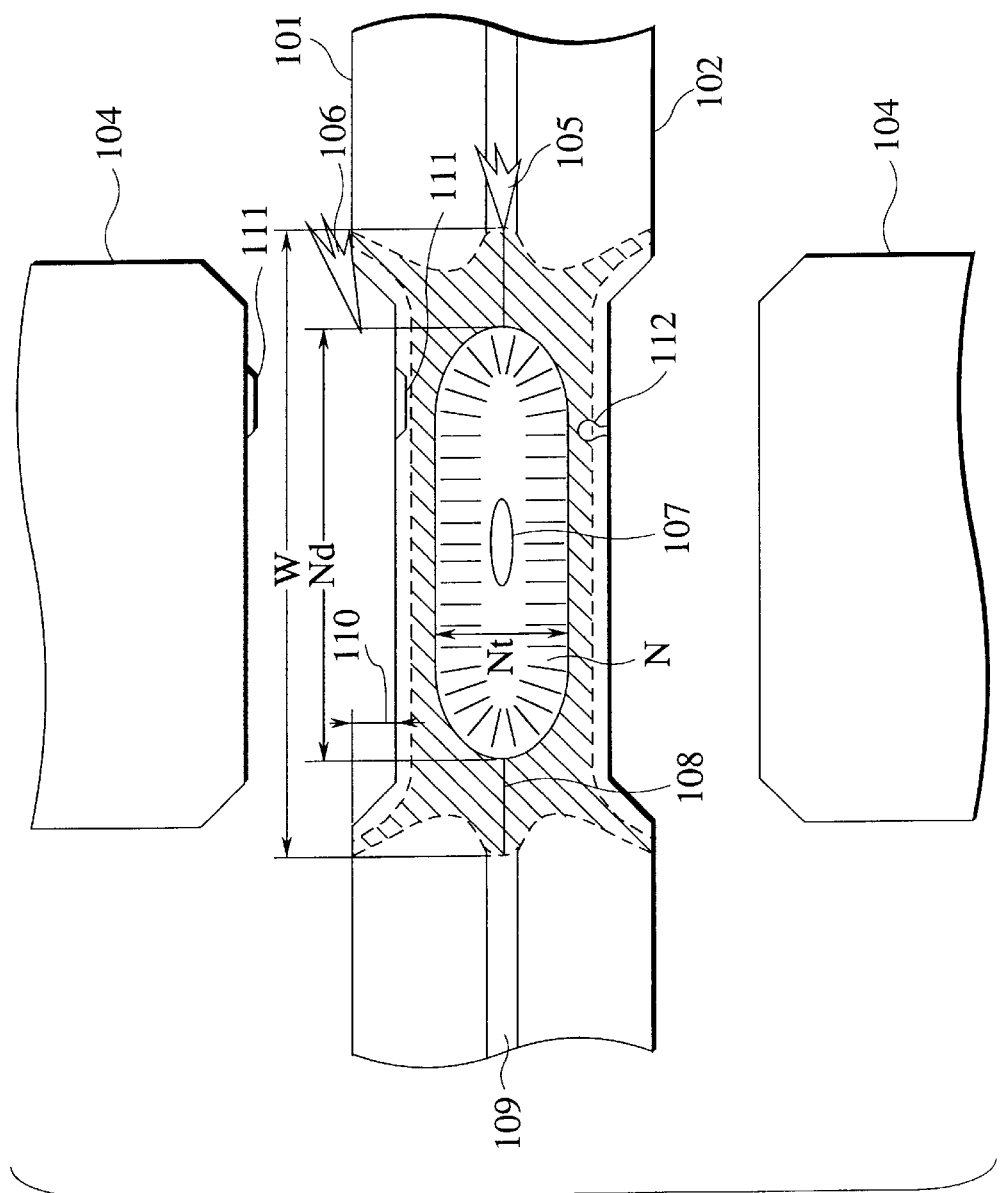
FIG. 1 is a section of a welding spot with a nugget.
Figure 2:
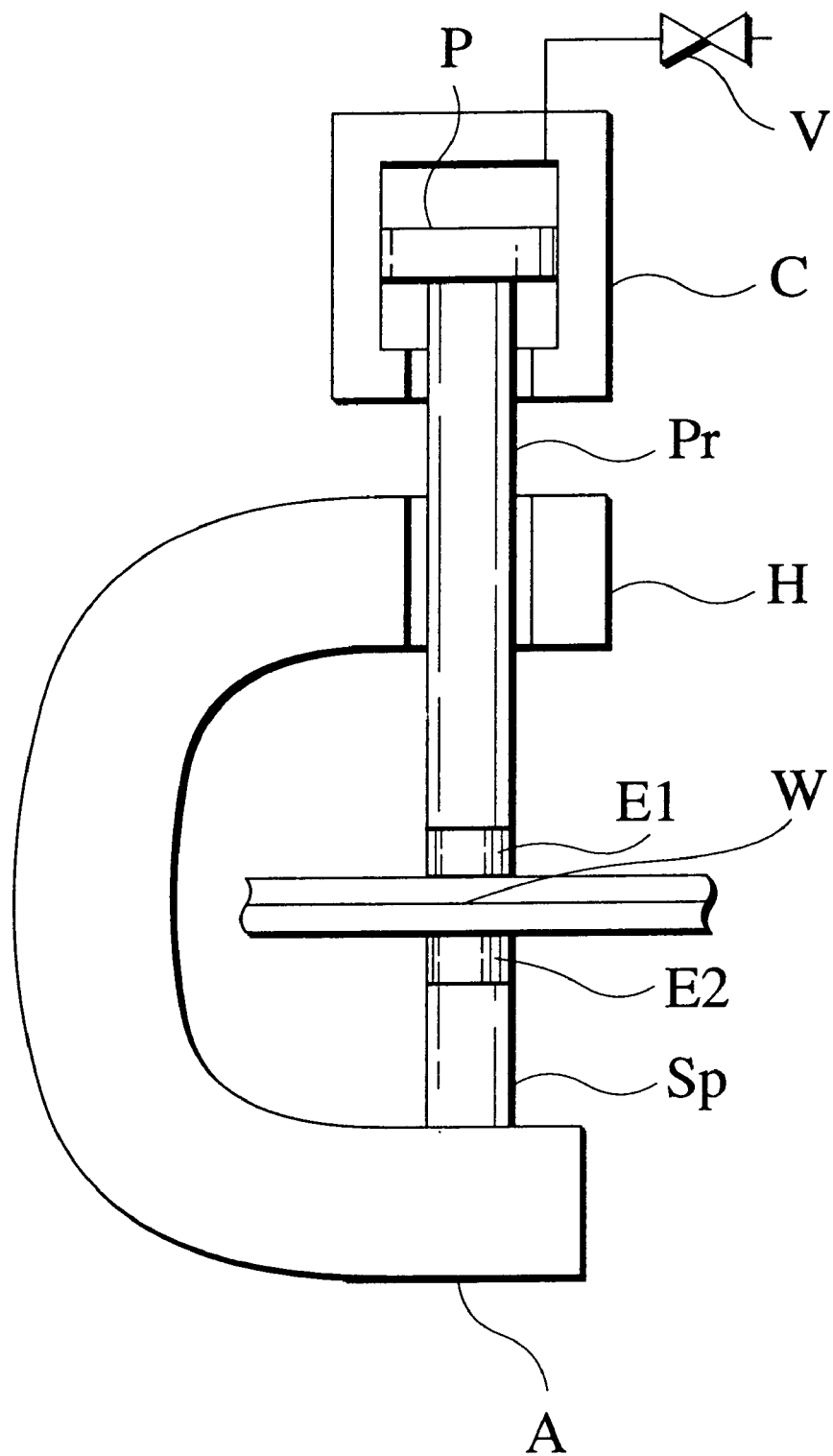
FIG. 2 is a schematic section of an essential portion of a spot welding machine applicable to the invention.

Recent spot welding systems (equipment) are automated. Most of such spot welding systems are arranged as robots, and welding condition outputs (start commands) are output by the robots.

Even in a multi-spot welding (equipment having electrode pressing devices fixed to a jig for welding a multiplicity of spots at once), a welding condition output (start command) is output from a host controller, so that welding conditions are obtainable at any device.

A high-performance welding timer (welding current controller) has an electrode pressing device control function, and is controllable for a pressing and a releasing of electrodes by an external start command.

The invention is addressed to any and all types of such spot welding systems.

There will be detailed below the preferred embodiments of the present invention with reference to the accompanying drawings. Like members are designated by like reference characters.

Figure 3:
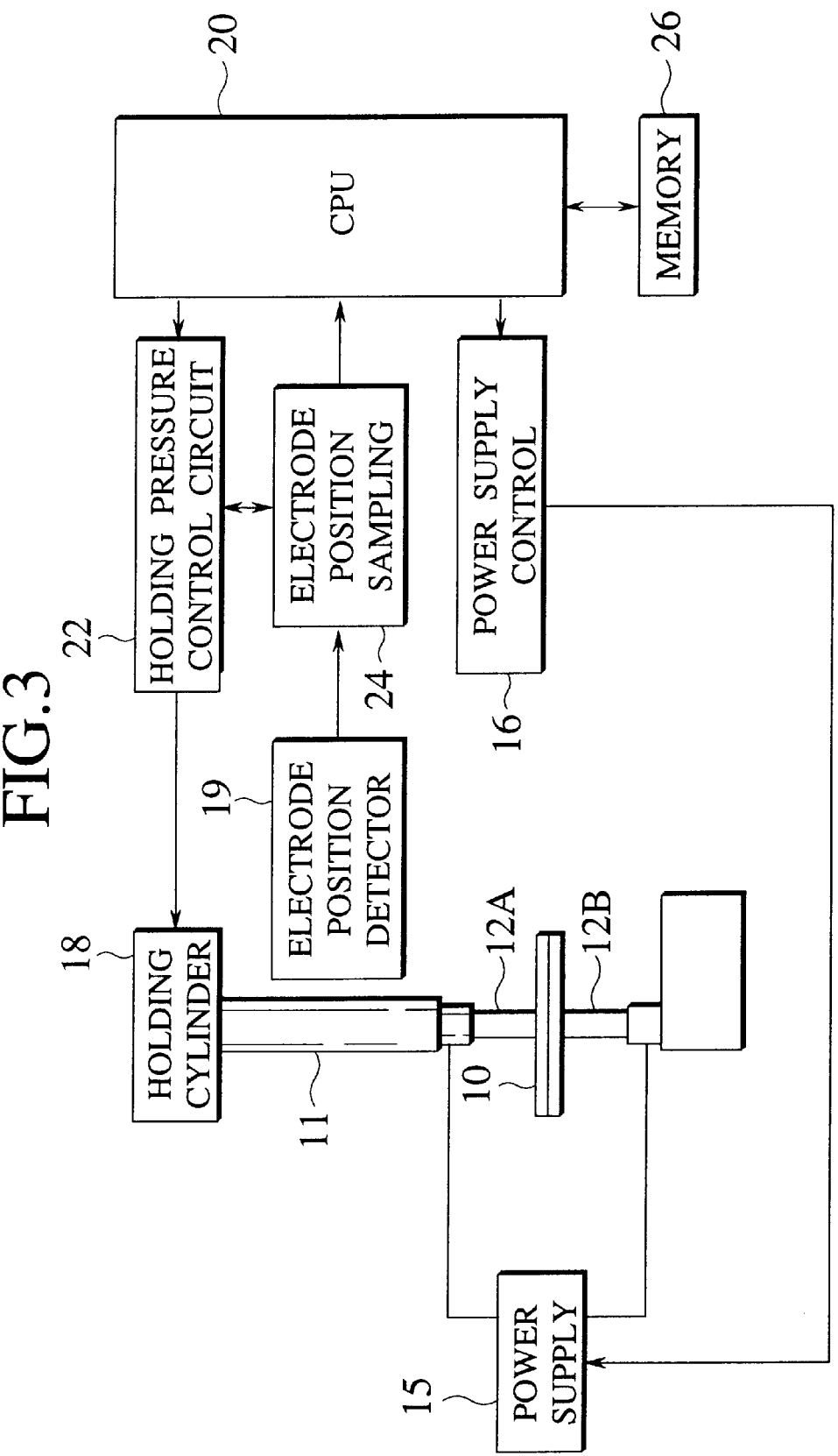
FIG. 3 is a block diagram of an entirety of a spot welding system according to an embodiment of the invention.

FIG. 3 is a block diagram of a spot welding system according to an embodiment of the invention.

The spot welding system comprises a stationary lower electrode with a chip 12B, a movable upper electrode with a chip 12A adapted for a downward advancement to hold a welding spot of a work (hereafter sometimes "base metal") 10 in cooperation with the lower electrode and for an upward retreat to set free the welding spot, a combination of a servo-motor with a holding cylinder (hereafter sometimes "pressure closing device") 18 and a holding pressure control circuit (hereafter sometimes "pressure closing pressure control device") 22 operable for the advancement and retreat of the upper electrode and for biasing the upper electrode with a controlled pressure acting on a piston of a cylinder (hereafter sometimes "welding gun") 11 in a direction in which the upper electrode downwardly advances, a combination of a power supply 15 and a power supply control 16 for supplying a controlled voltage between the electrodes, a combination of an electrode position detector 19 and an electrode position sampling device (hereafter sometimes "electrode position detection circuit") 24 for detecting a variation of a distance between chips 12A, 12B of the electrodes, and a central processing unit (hereafter sometimes "CPU") 20 as a computer cooperative with software programs stored in a memory 26 for controlling a welding quality of the welding spot on a basis of the detected variation of the inter-electrode distance. The CPU 20 and programs in the memory 26 constitute a master controller of the system, including a software integrator for determining a time integration of a variant representative of the inter-electrode distance, a software estimator for estimating a size of a nugget of the welding spot on a basis of the time integration, and a software decision-maker for making a decision on a conformity of the welding quality on a basis of an estimated size of the nugget. The nugget size may be a nugget diameter or nugget thickness.

The lower electrode chip 12B and upper electrode chip 12A fixed to the welding gun 11 are brought into vertical pressure contact with the base metal 10, i.e. a pair of welding plates lapped either on the other. The controlled voltage from the power supply 15 is supplied between the electrode chips 12A and 12B, so that a corresponding welding current is conducted through the welding spot. A magnitude and a conduction time of the welding current are controlled by the power supply control 16, which is controlled with a command from the CPU 20.

The electrode chip 12A is vertically moved by the pressure closing device 18 constituted with the servo motor, etc. The position of the electrode chip 12A is detected by the electrode position detector 19 constituted with, e.g., an encoder or the like. A slight vertical movement of the electrode chip 12A in welding is detected by the electrode position detector 19. The operation of the pressure closing device 18 is controlled by the closing pressure control circuit 22 operated on a basis of a command from the CPU 20. A displacement of the electrode chip 12A detected by the electrode position detector 19 is fed back to the closing pressure control circuit 22 to control a position of the pressure closing device 18 through the electrode position detection circuit 24.

The memory 26 stores various item data such as an integration start point and an integration end point (which will be described below), a regression expression, and the like.

Figure 4:
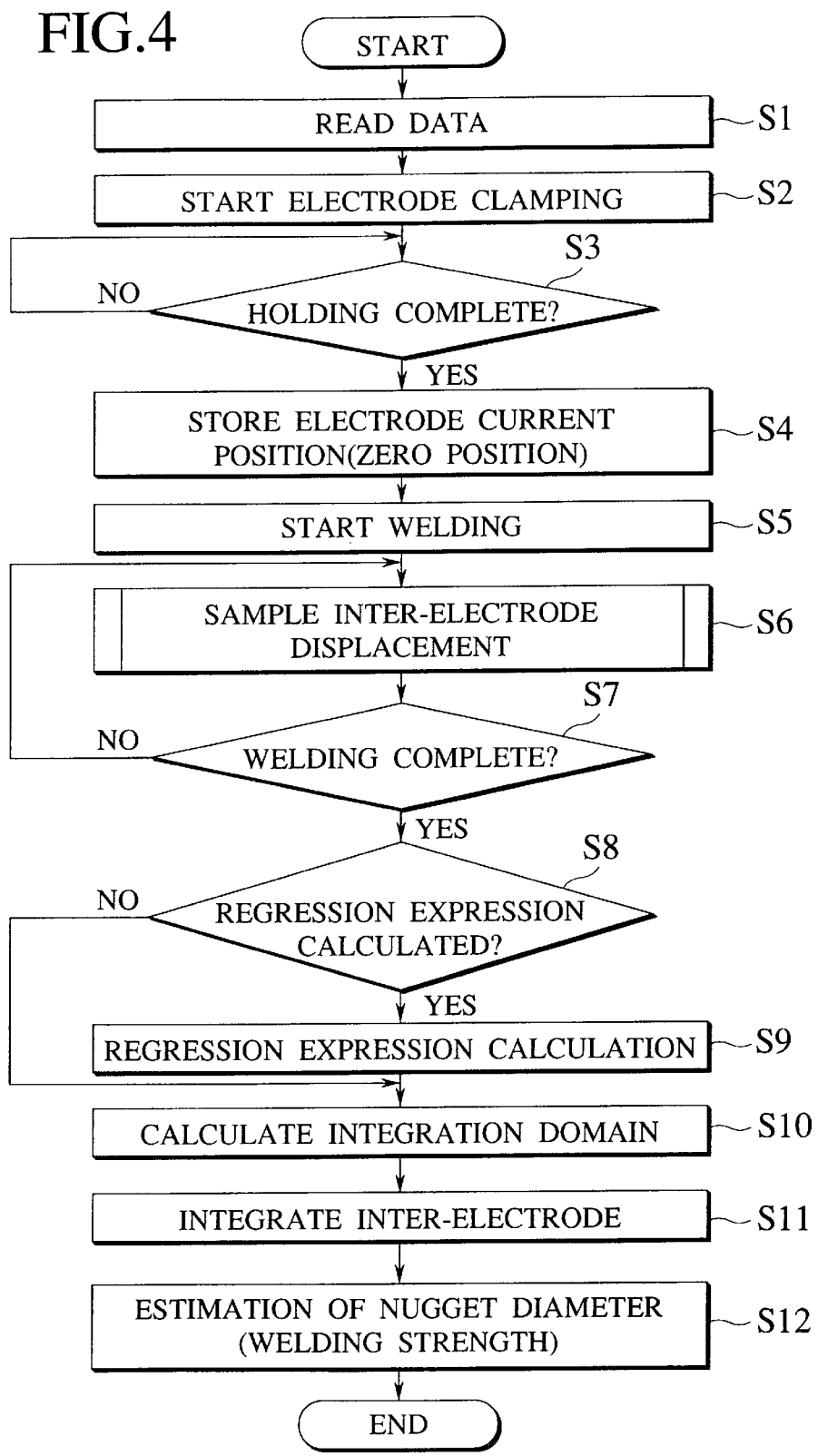
FIG. 4 is a flowchart of control actions of the spot welding system.
Figure 5:
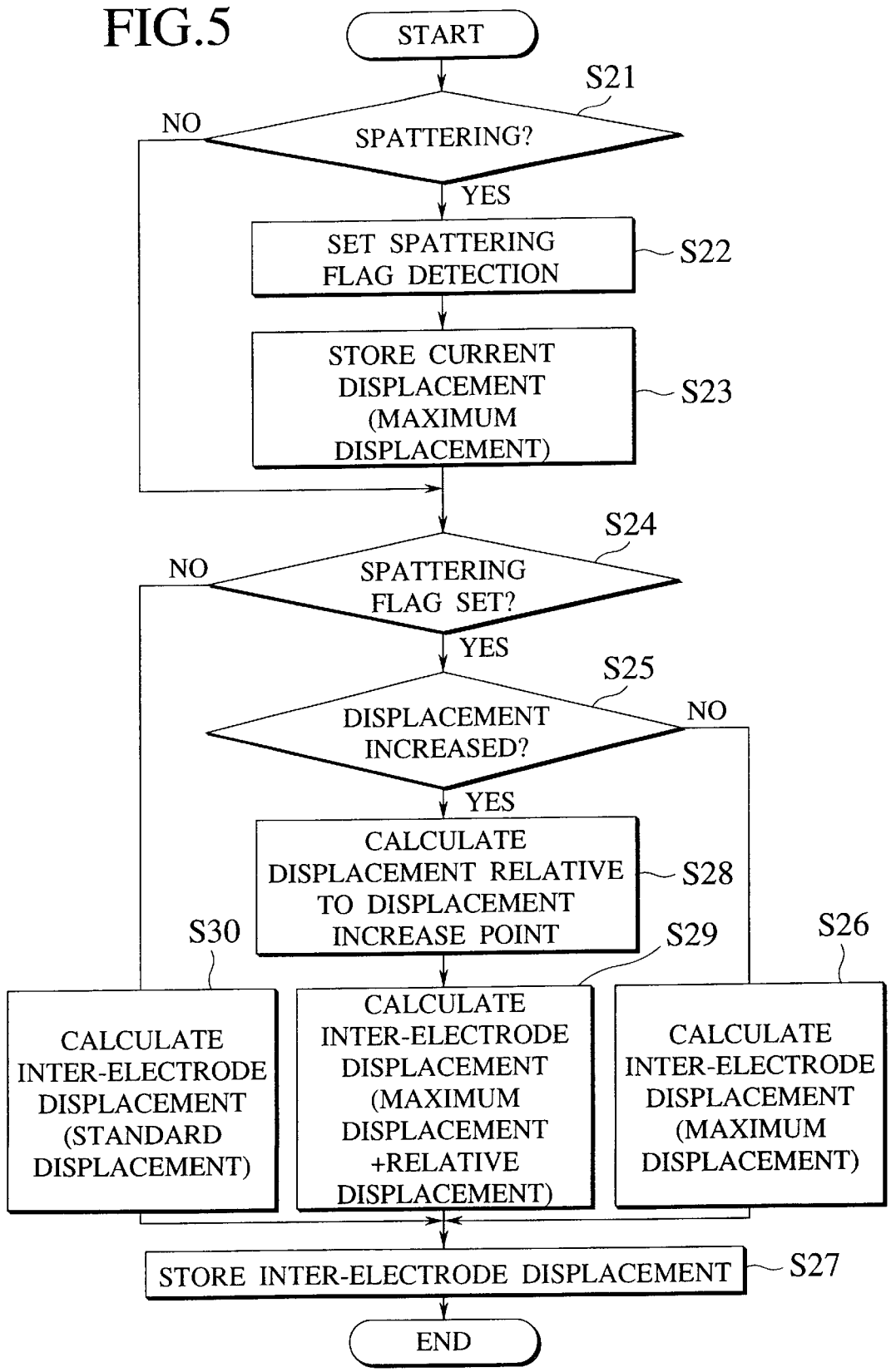
FIG. 5 is a flowchart of control actions to cope with an eventual spattering.

The flow charts shown in FIGS. 4 and 5 are of control actions of the system.

The flow charts show control routines according to the invention. The flow charts will be described below with reference to FIGS. 6 to 11.

S1

The CPU 20 loads item data stored in the memory 26.

The item data consist of, e.g., a welding current, a current conducting time, a welding pressure, the material of a welding plate, a displacement detection resolution, a sampling cycle, a welding method (single phase ac current and inverter), a thickness, material, and surface preparation of welding plates, a joining type of welding plates, and the like.

Regression coefficients calculated by an experiment in advance may be directly stored.

Although an estimated nugget diameter is calculated by calculating a regression expression as will be described later, regression coefficients constituting the regression expression are calculated from an experiment result such that an estimated value calculated by the regression expression is extremely close to a measured value. In this manner, when the regression coefficients are stored in advance, an estimated nugget diameter can be easily calculated by calculating a simple algebraic expression.

As a matter of course, by storing an experiment result, the regression coefficients may be sequentially calculated each time the regression expression is calculated.

S2, S3, S4

The CPU 20 outputs a closing command to the closing pressure control circuit 22. The closing pressure control circuit 22 receiving this command operates the pressure closing device (servo motor) 18 to cause the electrode chip 12A to be closed to the base metal 10. When the electrode chip 12A presses the base metal 10 with a predetermined pressure, the CPU 20 stores a current position of the electrode chip 12A. This stored position serves as an original position of an inter-electrode current position, i.e., a zero position. It is checked by the closing pressure control circuit 22 whether the base material is pressed with the predetermined pressure. The servo motor is used because the pressure can be controlled.

S5

When the base metal 10 is pressed with a predetermined pressure, the CPU 20 outputs a welding command to the power supply control 16.

The power supply control 16 receiving this command operates the power supply 15 to cause a predetermined current to flow in the base metal 10 through the electrode chips 12A and 12B. This flowing current is an AC current having a predetermined frequency as shown in FIG. 6.

S6, S7

Varying state of the displacement of the electrode chip 12A is sampled at a high speed by the electrode position detector 19 until the electrode chip 12A is opened, i.e., during current conduction to store a sampling result in the memory 26.

Figure 6:
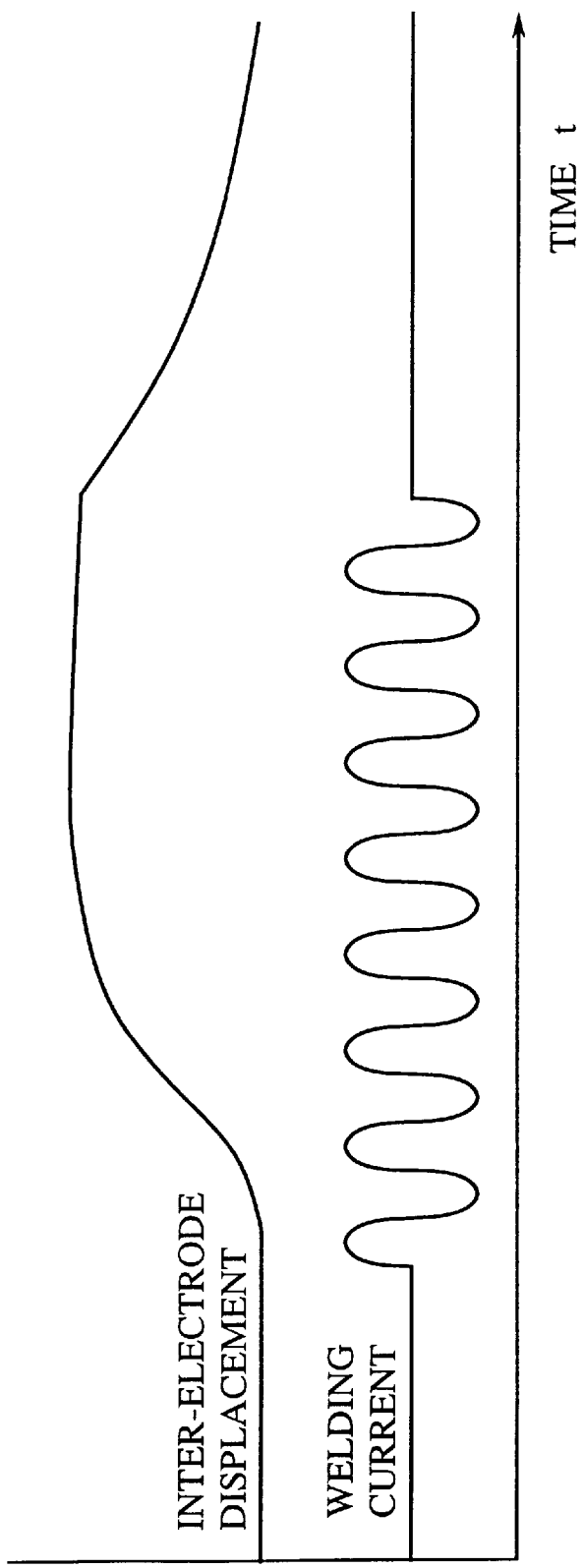
FIG. 6 is a time chart of variations of an inter-electrode displacement in a normal welding.

When the electrode chips 12A and 12B are rendered conductive to perform spot welding to the base metal 10, an inter-electrode displacement generally changes within a short time as shown in FIG. 6. More specifically, the base metal 10 begins to expand when a current conduction is started, and the base metal 10 expands until the base metal has a predetermined amount. The base metal 10 shrinks after a finish of current 10 conduction. The electrode position detector 19 detects a change of the inter-electrode displacement with time to output the change to the CPU 20 through the electrode position detection circuit 24. The CPU 20 performs sampling to the inter-electrode displacement at predetermined intervals to store the sampling result in the memory 26. The sampling cycle is optimally set depending on a period of time required for welding and precision required for inter-electrode displacement.

In a mode of the system in which an inter-electrode displacement Hent due to thermal expansion during a conduction of a welding current is sampled, the inter-electrode displacement during a conduction of a welding current is sampled to be stored.

In a mode of the system in which an inter-electrode displacement Hent due to thermal shrinkage after a finish of current conducting time is sampled, an inter-electrode displacement immediately after conduction of a welding current is completed is sampled to be stored.

If the memory 26 has a spare capacity, sampling of inter-electrode displacement is performed in a period of time from time at which the electrode chip 12A presses the base metal 10 to time at which the electrode chip 12A is opened (including conduction of a welding current, and after a finish of current conduction), and an integration process may be performed during a conduction of a welding current or after a finish of welding current conduction.

S8, S9

The CPU 20 loads a regression expression stored in the memory 26 to set an optimum regression expression. More specifically, the CPU 20 prepares a regression expression required to perform calculation for estimating a nugget diameter.

As this regression expression, the following two types of regression expressions are prepared.

The first regression expression is a regression expression for determining an estimated nugget diameter on a basis of an inter-electrode displacement integration value, a welding current value, a current conducting time, and a welding pressure (which will be described below). This regression expression can cope' with both a case wherein an inter-electrode displacement integration value calculated by processing to integrate an inter-electrode displacement due to thermal expansion during a conduction of a welding current and a case wherein an inter-electrode displacement integration value calculated by processing to integrate an inter-electrode displacement due to thermal shrinkage after a finish of conduction of a welding current.

The regression expression is represented as follows:

regression expression:

$$y = b0 + b1x1 + b2x2 + b3x3 + b4x4$$

$$Yi = a + byi + e$$

y: estimated nugget diameter (object variable)

x1: inter-electrode displacement integration value (explanation variable)

x2: welding current (explanation variable)

x3: current conducting time (explanation variable)

x4: welding pressure (explanation variable)

Yi: i-th measured nugget diameter yi: i-th estimated nugget diameter a: intercept b, b0 to b4: regression coefficients e: error The second regression expression is a regression expression for determining an estimated nugget diameter on a basis of an inter-electrode displacement integration value, the thickness, material, and surface preparation of welding plate, and a joining type of welding plates (which will be described below). This regression expression can cope with both a case wherein an inter-electrode displacement integration value calculated by processing to integrate an inter-electrode displacement due to thermal expansion during a conduction of a welding current and a case wherein an inter-electrode displacement integration value calculated by processing to integrate an inter-electrode displacement due to thermal shrinkage after a finish of conduction of a welding current.

The regression expression is represented as follows:
regression expression:

$$y = b0 + b1x1 + b2x2 + b3x3 + b4x4 + b5x5$$

$$Yi = a + byi + e$$

y: estimated nugget diameter (object variable)
x1: inter-electrode displacement integration value (explanation variable)
x2: thickness of welding plate (explanation variable)
x3: material of welding plate (explanation variable)
x4: joining type of welding plates (explanation variable)
x5: surface preparation of welding plate (explanation variable)
Yi: i-th measured nugget diameter
yi: i-th estimated nugget diameter
a: intercept
b, b0 to b5: regression coefficients
e: error

S10

An integration range is determined to calculate an inter-electrode displacement integration value. This integration range is stored in the memory 26. However, as an integration start point ta for determining the integration range, any one of the following points is selected to perform an integration process of the inter-electrode displacement Hexp due to thermal expansion.

1 The integration start point ta is determined in advance on a basis of welding conditions (welding current, current conducting time, welding pressure, material of welding plate, resolution for detecting displacement, sampling cycle, and welding type (single phase ac current and inverter)).

2 A point where an inter-electrode displacement during current conduction reaches or exceeds a predetermined level is determined as the integration start point ta.

3 A point where a predetermined period of time has elapsed from the start of current conducting time is determined as the integration start point ta.

Any one of the following points is selected to perform an integration process of the inter-electrode displacement Hent.

1 A current conducting time end point is determined as the integration start point ta.

2 A point where an inter-electrode displacement after a finish of current conducting time reaches a predetermined level or exceeds the predetermined level is determined as the integration start point ta.

3 A point where a predetermined period of time has elapsed from the end of current conducting time is determined as the integration start point ta.

In addition, as the integration end point tb for determining an integration range, any one of the following points is selected to perform an integration process of the inter-electrode displacement Hexp due to thermal expansion.

1 The integration end point tb is determined in advance on a basis of the above welding conditions.

2 A point where an inter-electrode displacement during current conduction or after a finish of current conducting time exceeds the maximum value and then decreases to a predetermined level or exceeds the predetermined level is determined as the integration end point tb.

3 A point where a predetermined period of time has elapsed from the integration start point ta is determined as the integration end point tb.

4 A point where the thermal expansion rate of an inter-electrode displacement during current conduction becomes 0 is determined as the integration end point tb.

5 A point where a predetermined period of time has elapsed from the start of current conducting time is determined as the integration end point tb.

Any one of the following points is selected to perform an integration process of the inter-electrode displacement Hcnt due to thermal shrinkage.

1 The integration end point tb is determined in advance on a basis of the above welding conditions.

2 A point where a predetermined period of time has elapsed from the integration start point ta is determined as the integration end point tb.

3 A point where a thermal expansion rate of an inter-electrode displacement during current conduction becomes 0 is determined as the integration end point tb.

4 A point where a predetermined period of time has elapsed from the end of current conducting time is determined as the integration end point tb.

In order to perform an integration process of the inter-electrode displacement Hexp due to thermal expansion, an integration range is determined by a combination of one of the three integration start points ta of the items 1 to 3 and one of the five integration end points of the items 1 to 5.

In order to perform an integration process of the inter-electrode displacement Hent due to thermal shrinkage, an integration range is determined by a combination of one of the three integration start points ta of the items 1 to 3 and one of the five integration end points tb of the items 1 to 4.

As the combinations, optimum combinations are selected in consideration of the welding conditions. The integration ranges may be determined such that optimum combinations are selected in advance, and the selected integration start point and the integration end point are stored in the memory 26.

S11

Figure 7:
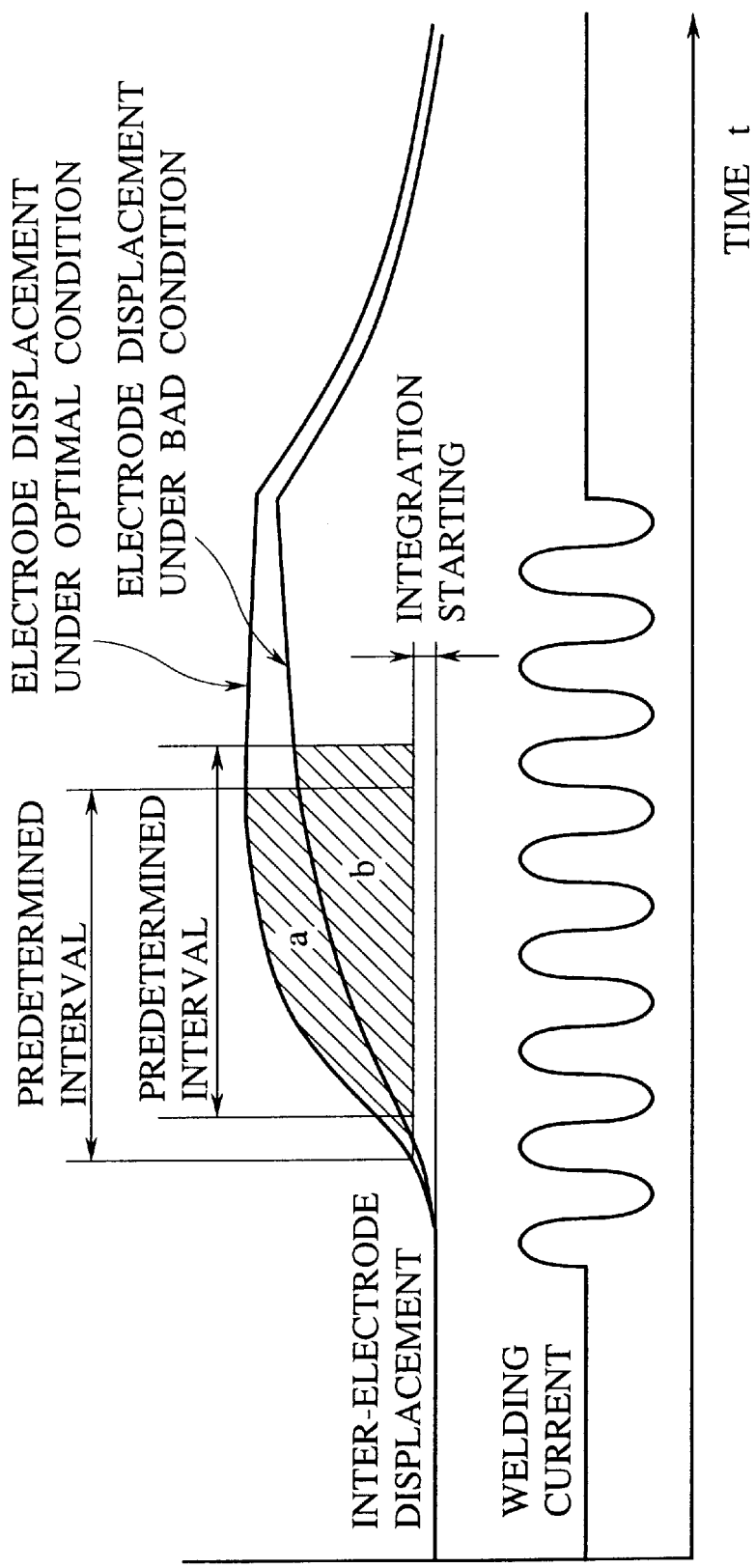
FIG. 7 is a time chart showing inter-electrode displacements under optimum and bad conditions.

The CPU 20 conceptually extracts an inter-electrode displacement stored in the memory 26 to describe a graph shown in FIG. 7, and an integration range selected in step S4 is applied to the graph to perform an integration process.

For example, when the selected integration start point ta is a point where an inter-electrode displacement during current conduction reaches a predetermined level, and the integration end point tb is a point where a predetermined period of time has elapsed from the integration start point, as shown in FIG. 7, an integration interval a is applied to an inter-electrode displacement obtained when welding is performed under the optimum conditions, and the integration process is executed in this range. An integration interval b is applied to an inter-electrode displacement obtained when welding is performed under adverse conditions, and an integration process is executed in this range.

S12

A result X1 obtained by the integration process, a welding current value X2, a current conducting time X3, and a welding pressure X4 are substituted into the first regression expression for determining an estimated nugget diameter y, and, at the same time, the regression coefficients b0 to b4 which are stored in advance or sequentially calculated are substituted into the first regression expression to calculate the estimated nugget diameter y, thereby estimating an actual weld nugget diameter (welding strength).

A result X1 obtained by the integration process, the thickness of a welding plate X2, a material X3, a joining type of welding plates X4, and surface preparation X5 are substituted into the second regression expression for determining an estimated nugget diameter y, and, at the same time, the regression coefficients b0 to b5 which are stored in advance or sequentially calculated are substituted into the second regression expression to calculate the estimated nugget diameter y, thereby estimating an actual weld nugget diameter (welding strength).

Although a nugget diameter is generally estimated on a basis of any one of the first regression expression and the second regression expression, the nugget diameter may be estimated by using both the regression expressions.

The above process is performed when welding is performed in a normal state. However, the position of the electrode chip 12A sharply varies when spattering occurs in welding to prevent welding strength from being correctly estimated. According to the invention, even in this case, the process of sampling an inter-electrode displacement is designed to keep the accuracy of an estimated value good.

FIG. 5 is a flow chart showing a subroutine of the flow chart in FIG. 4. The process of this flow chart will be described below.

S21

The CPU 20 checks whether spattering occurs in welding. This check is made by checking whether a sharp change in position of the electrode chip 12A detected by the electrode position detector 19 is detected.

Figure 8:
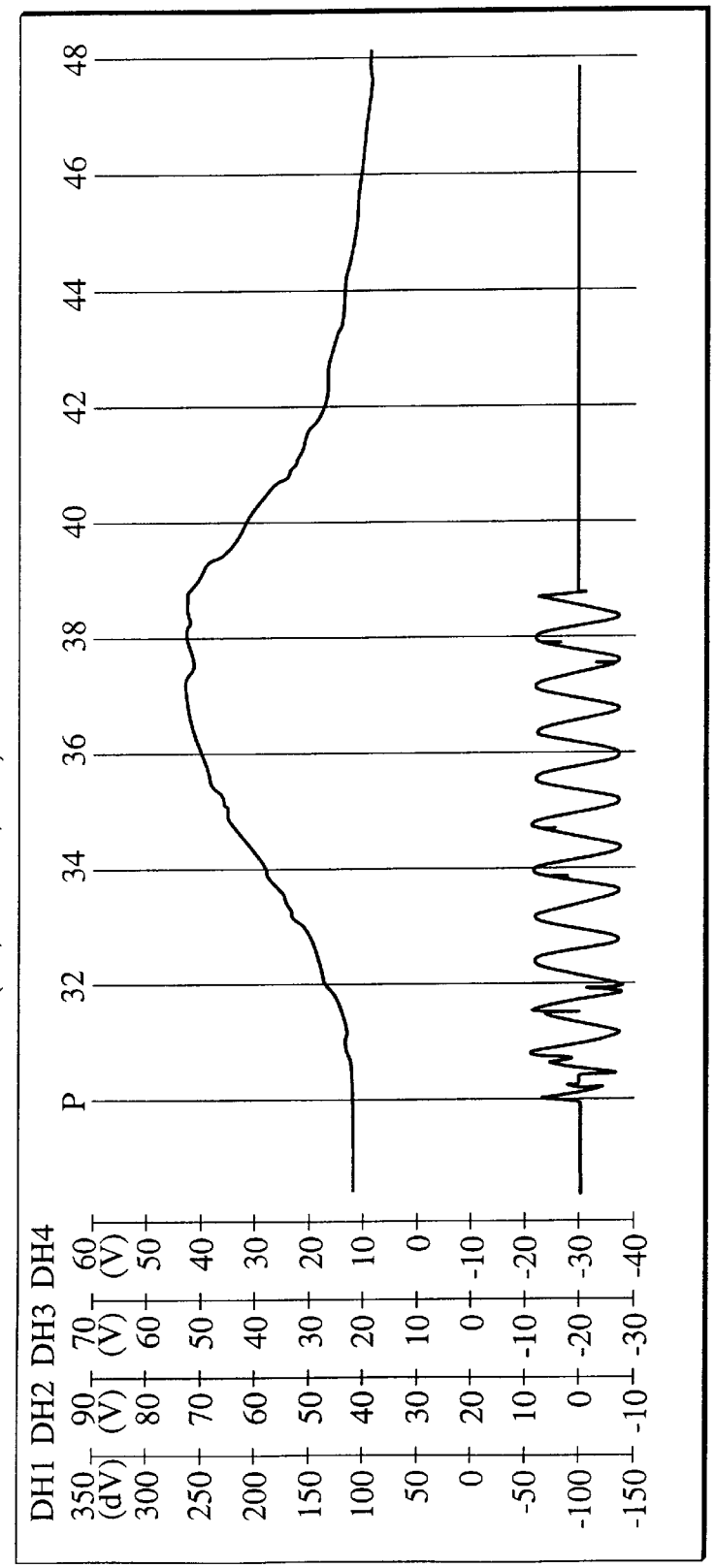
FIG. 8 is a graph of a varying inter-electrode displacement in a normal welding.
Figure 9:
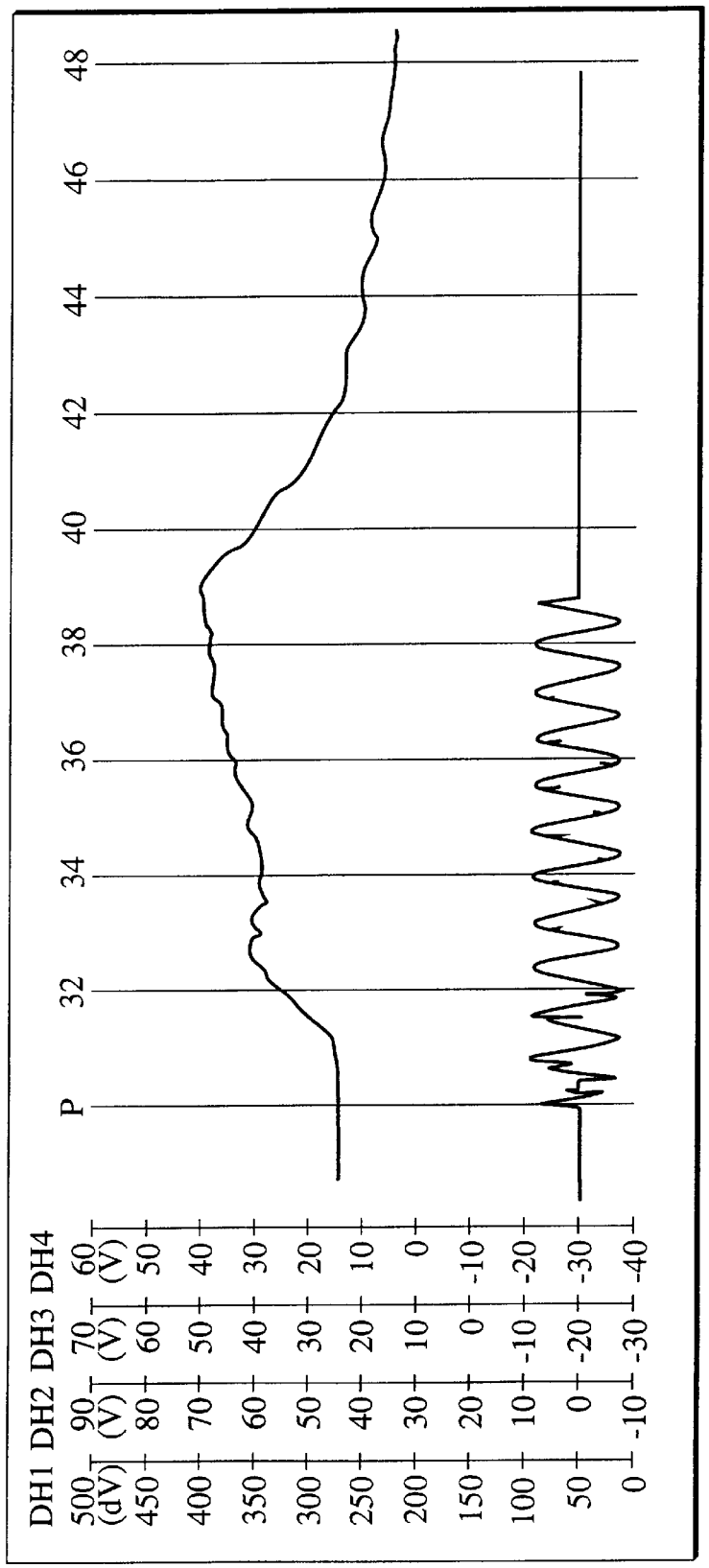
FIG. 9 is a graph of a varying inter-electrode displacement associated with a spattering.

As shown in FIG. 8, when preferable welding being free from spattering is performed, the displacement of the electrode chip 12A is not detected. On the other hand, as shown in FIG. 7, the moment spattering occurs, melted base metal is spattered. For this reason, the displacement of the electrode chip 12A sharply changes. The CPU 20 detects the sharp change to check the presence/absence of occurrence of spattering.

S22, S23

Figure 10:
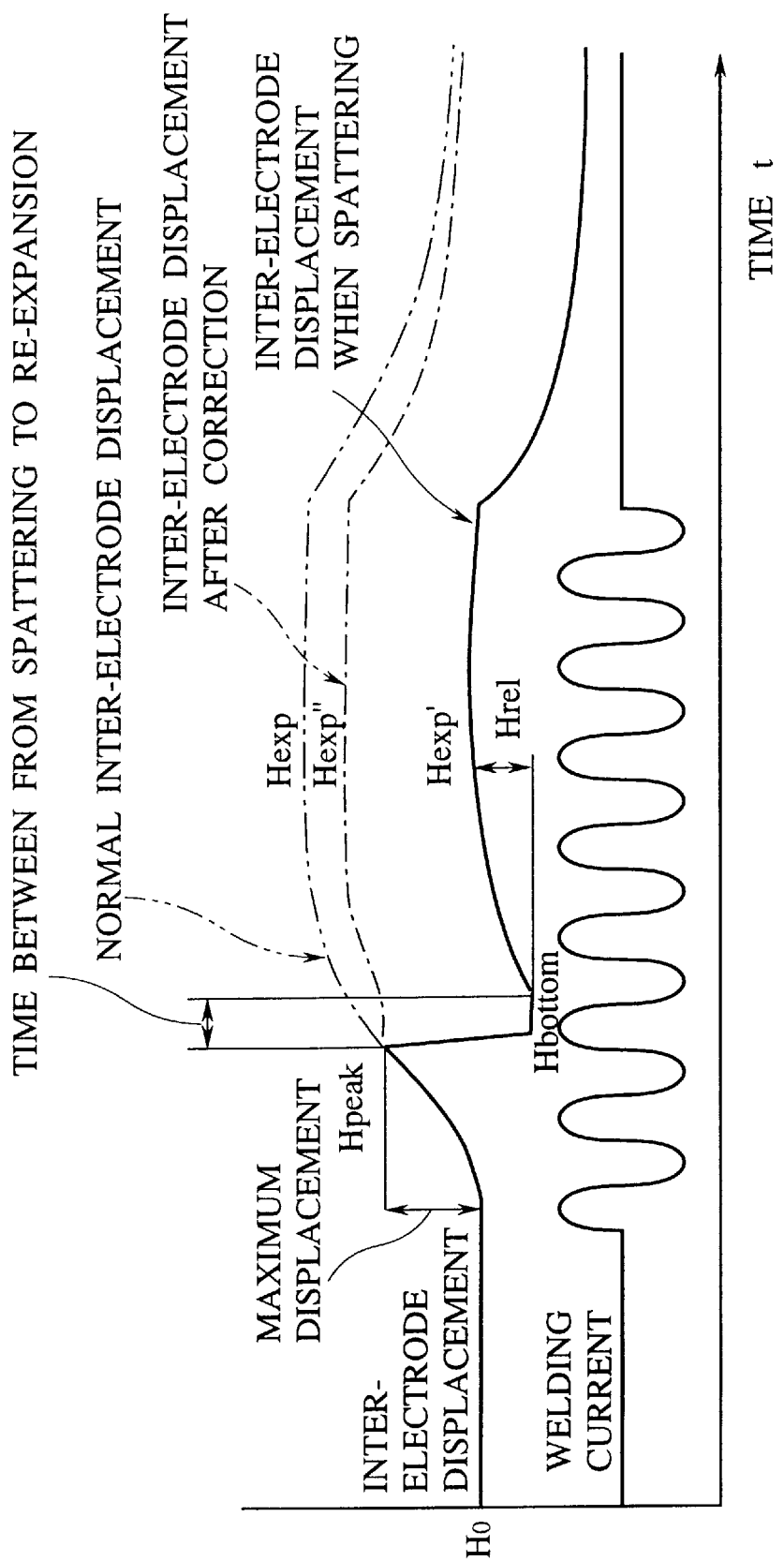
FIG. 10 is a graph describing a method of correcting an inter-electrode displacement associated with a spattering.
Figure 11:
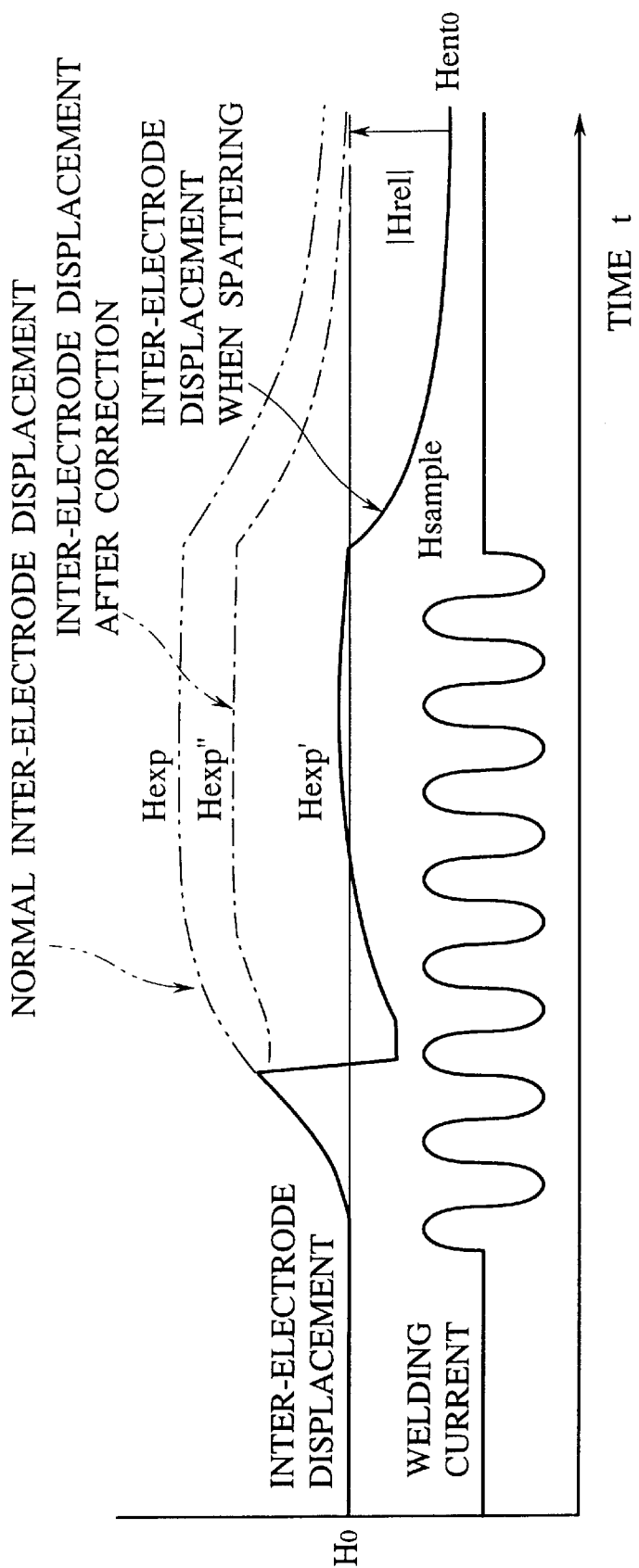
FIG. 11 is a graph describing another method of correcting an inter-electrode displacement associated with a spattering.

When occurrence of spattering is detected, the CPU 20 stores the occurrence of spattering and stores the position of the electrode chip 12A when the occurrence is detected. For example, as shown in FIG. 10, if spattering occurs, an inter-electrode displacement Hexp' shifts to be considerably decreased. For this reason, at this time, a maximum displacement Hpeak immediately before occurrence of spattering is stored in the memory 26.

S24 to S27

Until the base metal 10 begins to thermally expand again by a continuous welding current, the CPU 20 continuously stores the maximum displacement Hpeak immediately before occurrence of spattering each time sampling is performed.

S27 to S29

When the base metal 10 begins to thermally expand again by a continuous welding current, and a detected inter-electrode displacement shifts to be increased, as shown in FIG. 10, this point is set as a base point Hbottom. Subsequently, a relative displacement Hrel is added to the above-mentioned maximum displacement Hpeak, and the resultant value is stored as an inter-electrode displacement Hexp". With this process, the inter-electrode displacement Hexp" after a finish of correction when spattering occurs is approximated to inter-electrode displacement data Hexp obtained in normal welding.

S30

If occurrence of spattering is not detected, the above process need not be performed. For this reason, the same process as described in the flow chart in FIG. 4 is performed.

Example

An inter-electrode displacement in thermal expansion of single phase ac current spot welding for a general mild steel plate will be exemplified.

As standard conditions of general mild steel plate spot welding, conditions such as a best condition (A class), an intermediate condition (B class), and an ordinary condition (C class) are known. On the basis of the welding conditions, integration ranges ta to tb are determined.

For example, in A class, a welding current value is large, and current conducting time is short. For this reason, an integration range is relatively short. In C class, a welding current value is small, and current conducting time is long. For this reason, an integration range is long.

An integration range is simply calculated as described below:

integration start point ta=maximum displacement Hmax×k (k is about 0.1 to 0.3); or integration start point ta=current conducting time start time tw+current conducting time×k (k is about 0 to 0.3);

integration end point tb=integration start point ta+current conducting time×k (k is about 0.3 to 1).

The best condition (A class) for a mild steel plate having thickness t=0.8 mm is exemplified in this case. A welding current of 7,800 A, current conducting time of 8 cycles (160 msec), and a pressure of 190 kgf are set.

When normal welding is performed under the conditions, thermal expansion reaches its peak within half of the current conducting time, and an amount of expansion is 100 $\mu$m to 200 $\mu$m.

For this reason, integration ranges are determined as follows.

One of the integration ranges is a period of time from current start time to current end time during current conduction, and the other is set such that the integration start time ta is set to be a point exceeding max/4 (50 $\mu$m) at which a detected displacement is stable, and an integration end point is set to be ta+current conducting time. In addition, it is considered that the characteristics of welding quality can be extracted from an inter-electrode displacement on a basis of a welding current value, a pressure, the material of a base metal, a resolution for detecting a displacement, a sampling cycle, the shape and material of an electrode tip, a welding method (single phase ac current, inverter welding, or the like).

When an inter-electrode displacement is integrated on a basis of the integration range, basic data from which a nugget diameter (welding strength) of a spot-welded point which is not easily affected by the various welding conditions can be estimated can be obtained.

A regression expression is calculated by a multivariate analyzing method.

For example, an estimated nugget diameter y is used as an object variable, two types of inter-electrode displacement integration values (basic data) x 1 and x 2, a welding current value x 3, and a welding pressure x 4 are used as explanation variables, and stored regression coefficients b0 to b4 are used, thereby calculating a regression expression. As the regression expression at this time, $y=b0+b1x1+b2x2+b3x3+b4x4$ is used.

When correlation between data which is actually sampled by the above method and a measured nugget diameter was checked, a correlation coefficient was 0.994, and a residual standard deviation was 103.9 μm (about 0.1 mm).

In addition, when the thickness of a base metal, a material, an expansion coefficient, surface preparation, the number of stacked plates, the shape of an electrode chip, the mechanical response of a welding system, the electric response, and the like are added as explanation variables as needed, a spot welding nugget diameter (welding strength) can be estimated at a high precision under various conditions.

An inter-electrode displacement in thermal shrinkage after a finish of current conducting time will be described below.

A basic method of calculating an integration range and a method of calculating a regression expression are the same as in the inter-electrode displacement in thermal expansion. Inter-electrode displacement integration in shrinkage is characterized in that the attenuation of an inter-electrode displacement detected in thermal expansion is corrected by the shape of an electrode tip.

Although a base metal is heated, expanded, and melted by a welding current in spot welding, when the contact area of an electrode tip is small, the electrode tip is sunk to a position where the electrode tip contact area and a pressure are well balanced in the expansion process and the welding process.

For this reason, a detected inter-electrode displacement is given by thermal expansion amount—sinking amount, a detected thermal expansion amount is smaller than the original thermal expansion amount. In comparison with this, an inter-electrode displacement in thermal shrinkage after a finish of current conducting time can be stably detected because the inter-electrode displacement is always performed in thermal shrinkage from the position the electrode tip contact area and the pressure are well balanced.

Therefore, an inter-electrode displacement integration value in thermal expansion and an inter-electrode displacement integration value in thermal shrinkage are compared with each other, the larger displacement integration amount is used, or the displacement integration amount in thermal expansion is multiplied by the ratio of the integration values as a correction coefficient k. In this manner, a spot welding nugget diameter (welding strength) can be estimated at a higher precision.

When spattering occurs in welding, the inter-electrode displacement Hexp' is continuously sampled. This sampling is performed until an inter-electrode displacement in thermal shrinkage after a finish of welding current becomes 0. Data is directly stored in the memory 26 without being specially processed.

Upon completion of sampling, data in the memory 26 is loaded, an inter-electrode displacement obtained when the displacement rate of an inter-electrode displacement due to thermal shrinkage after a finish of current conducting time becomes 0 is represented by Hcnt0. In this case, as shown in FIG. 1, an absolute value Hrel of a relative displacement between the inter-electrode displacement Hcnt0 and a 0-position (reference point) H0 of an inter-electrode displacement before the start of current conducting time is added to sampling data Hsample obtained subsequent to the occurrence of spattering, and the inter-electrode displacement Hexp' subsequent to the occurrence of spattering is corrected.

More specifically, the following equations are satisfied:
relative displacement Hrel after occurrence of spattering= Hcnt0−H0; and corrected displacement Hexp'=Hsample+Hrel.

A data lacking portion (portion in which an inter-electrode displacement varied by spattering but by thermal expansion) in occurrence of spattering interpolates a displacement obtained when the maximum displacement Hpeak immediately before occurrence of spattering and the variation of the inter-electrode displacement are converged wit hastraight line. This process approximates an inter-electrode displacement Hexp" after correction in occurrence of spattering to the inter-electrode displacement data Hexp in normal welding. The time-series data Hexp" is integrated in the above integration ranges ta to tb.

After an integration value is calculated, a regression expression for determining an estimated nugget diameter is calculated.

An estimated nugget diameter y is used as an object variable, two types of inter-electrode displacement integration values (basic data) x 1 and x 2, a welding current value x 3, and a welding pressure x 4 are used as explanation variables, and stored regression coefficients b0 to b4 are used, thereby calculating a regression expression. As the regression expression at this time, $y=b0+b1x1+b2x2+b3x3+b4x4$ is used.

Partial regression variables b of the regression expression is calculated by using a method of least squares such that an error between a measured nugget diameter Y and an estimated nugget diameter y is minimum. At this time, two variables, i.e., the i-th measured nugget diameter Yi and the i-th estimated nugget diameter yi are linearly related to each other. This relationship is expressed by the following single regression expression using a: intercept a, a gradient b, and an error e.

$Yi=a+byi+e$

In addition, a time from occurrence of spattering to occurrence of re-expansion and a variation of inter-electrode displacement due to spattering are added to the corrected inter-electrode displacement integration value as explanation variables to calculate a regression expression. In this manner, a nugget diameter can be estimated at a high precision even in occurrence of spattering.

The nugget diameter calculated as described above is determined by the following manner.

A test of welding strength is generally performed as a quantitative index. As typical welding methods, a tensile shearing test and a tensile test are used. However, products are rarely tested by such a test machine in a production field, and determined is performed by using a welded nugget diameter as a substitute characteristic.

A mild steel plate is exemplified. When welding is performed under the standard conditions, the nugget diameter is determined by using a determination reference of $4.5\ t^{0.5}$ to $5.5\ t^{0.5}$ mm. If the estimated nugget diameter y falls within the range of the numerical values, it is determined that normal spot welding is performed.

According to the embodiments described, a nugget diameter is estimated by processing to integrate an inter-electrode displacement, with a high accuracy free from external disturbances.

There is set a time interval for an integration of an inter-electrode displacement, covering various actions of electrodes during or after current conduction, permitting an accurate estimation without external disturbances.

A nugget diameter is estimated by using a regression expression in consideration of diverse welding conditions, eliminating adverse effects of the diversity.

An attenuation of the inter-electrode displacement is corrected by a correction coefficient, with the higher accuracy.

If a spattering occurs during a welding, there is held a maximum displacement immediately before an occurrence of the spattering, permitting a high accuracy without influences of the spattering.

According to the invention, unlike the prior art, a nugget diameter is not simply estimated on a basis of the maximum displacement of an inter-electrode displacement during a conduction of a welding current or the thermal expansion rate of a base metal, but an inter-electrode integration value is calculated by integrating an inter-electrode displacement over a predetermined interval, thereby estimating a nugget size. Therefore, an optimum integration interval can be applied depending on a welding state, and a nugget diameter can be estimated at an extremely high precision, so that estimation of welding strength has an extremely high accuracy.

While preferred embodiments of the present invention have been described using specific terms, such description is for illustrative purposes, and it is to be understood that changes and variations may be made without departing from the spirit or scope of the following claims.

What is claimed is:

1. A spot welding system comprising:
    a first and a second electrode adaptive for a relative advancement to each other to hold therebetween a welding spot of a work and for a relative retreat form each other to set free the welding spot;
    a mechanism for biasing either electrode of the first and the second electrode with a controlled pressure in a direction in which the either electrode makes the relative advancement;
    a power supply for supplying a controlled voltage between the first and the second electrode;
    a detector for detecting a variation of a distance between the first and the second electrode; and
    a controller for controlling a welding quality of the welding spot on a basis of a detected variation of the distance, the controller comprising:
        an extrenum holder for holding an extrenum of the detected variation before a spattering at the welding spot;
        a base setter for setting a base to be the detected variation upon a restart of a thermal expansion of the welding spot after the spattering with a continued welding current conducted through the welding spot;
        an adder for adding a difference between the base and the detected variation to the extrenum to provide a corrected variation;
        an integrator for determining a time integration of the corrected variation;
        an estimator for estimating a size of a nugget of the welding spot on a basis of the time integration; and
        a decision-maker for making a decision on a conformity of the welding quality on a basis of an estimated size of the nugget.

2. The spot welding system as claimed in claim 1, wherein the integrator makes the time integration over an integration interval covering a time interval in which the thermal expansion proceeds, as the welding spot is heated with the continued welding current.

3. The spot welding system as claimed in claim 1, wherein the integrator makes the time integration over an integration interval covering a time interval in which the welding spot shrinks with the continued welding current interrupted after the thermal expansion.

4. The spot welding system as claimed in claim 1, wherein the integrator makes the time integration over an integration interval covering an arbitrary one of plural time intervals preset to a corresponding one of plural combinations of welding conditions of the welding spot.

5. The spot welding system as claimed in claim 1, wherein the estimator has a linear first model representing the size of the nugget, the first model including the time integration as a model element thereof.

6. The spot welding system as claimed in claim 5, wherein the estimator further has a second model for evaluating an error of the first model.

7. The spot welding system as claimed in claim 5, wherein the first model is representative by a recurrence formula for a multivariate analysis of the size of the nugget.

8. The spot welding system as claimed in claim 7, wherein the recurrence formula includes as explanation variables thereof an amplitude and a conduction time of the continued welding current, and the controlled pressure.

9. The spot welding system as claimed in claim 7, wherein the welding spot comprises a pair of plate members, and the recurrence formula includes as explanation variables thereof a plate thickness, a material, a joining pattern and a surface preparation of the plate members.

10. The spot welding system as claimed in claim 5, wherein the model element has a correction factor in consideration of one of a relationship between the thermal expansion and a contraction of the welding spot and an effect of the spattering.

11. The spot welding system as claimed in claim 1, further comprising processor elements for
    having a first value of the time integration along the thermal expansion with the continued welding current conducted and a second value of the time integration along a thermal shrinkage with the continued welding current interrupted,
    calculating a correction coefficient equivalent to the second value divided by the first value, and
    multiplying values of the time integration along the thermal expansion by the correction coefficient to correct an attenuation of the inter-electrode displacement due to a tip contact area of the electrodes.

12. The spot welding system as claimed in claim 1, wherein the time integration starts when the distance between the electrodes has a predetermined value or with a lapse of a predetermined time after a start of the continued welding current.

13. The spot welding system as claimed in claim 1, wherein the time integration ends when the distance between the electrodes has a predetermined value or with a lapse of a predetermined time after a start of the continued welding current.

14. The spot welding system as claimed in claim 1, wherein the controller processes the variation of the distance between the electrodes to be insignificant along the spattering.

15. A spot welding system comprising:
    a first and a second electrode adaptive for a relative advancement to each other to hold therebetween a welding spot of a work and for a relative retreat from each other to set free the welding spot;
    a mechanism for biasing either electrode of the first and the second electrode with a controlled pressure in a direction in which the either electrode makes the relative advancement;

a power supply for supplying a controlled voltage between the first and the second electrode;

a detector for detecting a variation of a distance between the first and the second electrode; and controlling means for controlling a welding quality of the welding spot on a basis of the detected variation of the distance, the controlling means comprising:

extrenum holding means for holding an extrenum of the detected variation before a spattering at the welding spot;

base setting means for setting a base to be the detected variation upon a restart of the thermal expansion of the welding spot after the spattering with a continued welding current conducted through the welding spot;

adding means for adding a difference between the base and the detected variation to the extrenum to provide a corrected variation;

integrating means for determining a time integration of the corrected variation;

estimating means for estimating a size of a nugget of the welding spot on a basis of the time integration; and deciding means for making a decision on conformity of the welding quality on a basis of an estimated size of the nugget.

16. The spot welding system as claimed in claim 15, further comprising processing means for having a first value of the time integration along the thermal expansion with the continued welding current conducted and a second value of the time integration along a thermal shrinkage with the continued welding current interrupted, calculating a correction coefficient equivalent to the second value divided by the first value, and multiplying values of the time integration along the thermal expansion by the correction coefficient to correct an attenuation of the inter-electrode displacement due to a tip contact area of the electrodes.

17. A spot welding method comprising the steps of:

having a first and a second electrode making a relative advancement to each other to hold therebetween a welding spot of a work;

biasing either electrode of the first and the second electrode with a controlled pressure in a direction in which the either electrode makes the relative advancement;

supplying a controlled voltage between the first and the second electrode;

detecting a variation of a distance between the first an the second electrode; and controlling a welding quality of the welding spot on a basis of the detected variation of the distance, the controlling step comprising:

holding an extrenum of the detected variation before a spattering at the welding spot;

setting a base to be the detected variation upon a restart of the thermal expansion of the welding spot after the spattering with a continued welding current conducted through the welding spot;

adding a difference between the base and the detected variation to the extrenum to provide a corrected variation;

determining a time integration of the corrected variation;

estimating a size of a nugget of the welding spot on a basis of the time integration; and making a decision on a conformity of the welding quality on a basis of an estimated size of the nugget.

18. The spot welding method as claimed in claim 17, further comprising the steps of:

having a first value of the time integration along the thermal expansion with the continued welding current conducted and a second value of the time integration along a thermal shrinkage with the continued welding current interrupted;

calculating a correction coefficient equivalent to the second value divided by the first value; and multiplying values of the time integration along the thermal expansion by the correction coefficient to correct an attenuation of the inter-electrode displacement due to a tip contact area of the electrodes.

19. A nugget size estimation system comprising:

an extrenum holder for holding an extrenum of a detected variation of a distance between electrode that have a welding spot held therebetween under pressure, as the extrenum has occurred before a spattering at the welding spot;

a base setter for setting a base to be the detected variation upon a restart of a thermal expansion of the welding spot after the spattering with a continued welding current conducted through the welding spot;

an adder for adding a difference between the base and the detected variation to the extrenum to provide a corrected variation;

an integrator for determining a time integration of the corrected variation; and an estimator for estimating a size of a nugget of the welding spot on a basis of the time integration.

20. The nugget size estimation system as claimed in claim 19, further comprising processor elements for having a first value of the time integration along the thermal expansion with the continued welding current conducted and a second value of the time integration along a thermal shrinkage with the continued welding current interrupted, calculating a correction coefficient equivalent to the second value divided by the first value, and multiplying values of the time integration along the thermal expansion by the correction coefficient to correct an attenuation of the inter-electrode displacement due to a tip contact area of the electrodes.

21. A nugget size estimation system comprising:

extrenum holding means for holding an extrenum of a detected variation of a distance between electrodes that have a welding spot held therebetween under pressure, as the extrenum has occurred before a spattering at the welding spot;

base setting means for setting a base to be the detected variation upon a restart of a thermal expansion of the welding spot after the spattering with a continued welding current conducted through the welding spot;

adding means adding a difference between the base and the detected variation to the extrenum to provide a corrected variation;

integrating means for determining a time integration of the corrected variation; and estimating means for estimating a size of a nugget of the welding spot on a basis of the time integration.

22. The nugget size estimation system as claimed in claim 21, further comprising processing means for having a first value of the time integration along the thermal expansion with the continued welding current conducted and a second value of the time integration along a thermal shrinkage with the continued welding current interrupted, calculating a correction coefficient equivalent to the second value divided by the first value, and multiplying values of the time integration along the thermal expansion by the correction coefficient to correct an attenuation of the inter-electrode displacement due to a tip contact area of the electrodes.

23. A nugget size estimation method comprising the steps of:

holding an extrenum of a detected variation of a distance between electrodes that have a welding spot held therebetween under pressure, as the extrenum has occurred before spattering at the welding spot;

setting a base to be the detected variation upon a restart of a thermal expansion of the welding spot after the spattering with a continued welding current conducted through the welding spot;

adding a difference between the base and the detected variation to the extrenum to provide a corrected variation;

determining a time integration of the corrected variation; and estimating a size of a nugget of the welding spot on a basis of the time integration.

24. The nugget size estimation method as claimed in claim 23, further comprising the steps of:

having a first value of the time integration along the thermal expansion with the continued welding current conducted and a second value of the time integration along a thermal shrinkage with the continued welding current interrupted;

calculating a correction coefficient equivalent to the second value divided by the first value; and multiplying values of the time integration along the thermal expansion by the correction coefficient to correct an attenuation of the inter-electrode displacement due to a tip contact area of the electrodes.

25. A method of estimating a nugget diameter in a spot welding, the method comprising the steps of:

holding a welding spot between electrodes under pressure to detect an inter-electrode displacement therebetween;

conducting a welding current through the electrodes and the welding spot, causing a thermal expansion of the welding spot;

detecting a spattering occurred at the welding spot during the thermal expansion;

identifying an extrenum of detected values of the inter-electrode displacement before the spattering;

processing detected values of the inter-electrode displacement after the spattering to determine a growth of the thermal expansion after the spattering;

adding the growth to the extrenum to provide substitute values for the detected values after the spattering;

integrating detected values of the inter-electrode displacement, using the substitute values, to make a time integration of the inter-electrode displacement; and estimating a nugget diameter of the welding spot on the basis of the time integration.

26. The method as claimed in claim 25, further comprising the steps of:

having a first value of the time integration along the thermal expansion with the welding current conducted and a second value of the time integration along a thermal shrinkage with the welding current interrupted;

calculated a correction coefficient equivalent to the second value divided by the first value; and multiplying values of the time integration along the thermal expansion by the correction coefficient to correct an attenuation of the inter-electrode displacement due to a tip contact area of the electrodes.

27. A method of estimating a nugget diameter in a spot of welding, the method comprising the steps of:

holding a welding spot between electrodes under pressure, to detect an inter-electrode displacement therebetween;

detecting an initial value of the inter-electrode displacement before conducting a welding current through the electrodes and the welding spot, continuing a conduction of the welding current, causing a thermal expansion of the welding spot;

detecting a spattering occurred at the welding spot during the thermal expansion;

interrupting the conduction of the welding current, causing a thermal shrinkage of the welding spot;

detecting a final value of the inter-electrode displacement associated with the thermal shrinkage;

adding a difference between the initial and final values to detected values of the inter-electrode displacement after the spattering, to provide substitute values for the detected values;

identifying an extrenum of the detected values of the inter-electrode displacement before the spattering;

integrating detected values of the inter-electrode displacement using the substitute values, to make a time integration of the inter-electrode displacement; and estimating a nugget diameter of the welding spot on a basis of the time integration.

28. The method as claimed in claim 27, wherein the time integration is made within an integration interval between a start point and an end point, wherein the start point is defined as one of:
a point of time when the current conduction is interrupted;
a point of time after the current conduction when the inter-electrode displacement reaches or exceeds a predetermined level; and
a point of time when a predetermined period has elapsed after the current conduction, and the end point is defined as one of:
a point of time depending on a welding condition; and
a point of time when a predetermined period has elapsed after the current conduction.

29. A method estimating a nugget diameter in spot welding, the method comprising the step of:

estimating an actual weld nugget diameter by an integration of an inter-electrode displacement due to a thermal expansion during a conduction of a welding current, wherein the integration of the inter-electrode displacement due to the thermal expansion is performed within an integration interval defined by a combination of an integration start point and an integration end point, the integration start point is one of:
an integration start point determined in advance on basis of welding conditions;

an integration start point determined as a point during a current conduction, where the inter-electrode displacement reaches or exceeds a predetermined level; and an integration start point determined as a point where a predetermined period of time has elapsed from a start of a current conduction, and the integration end point is one of:

an integration end point determined in advance on basis of the welding conditions;

an integration end point determined as a point during or after a current conduction, where the inter-electrode displacement as it has once exceeded a maximum value, decreases to or exceeds a predetermined level;

integration end point determined as a point where a predetermined period of time has elapsed from the integration start point;

an integration end point determined as a point where a thermal expansion rate based on the inter-electrode displacement during a current conduction becomes a 0; and an integration end point determined as a point where a predetermined period of time has elapsed from a start of a current conduction, and a regression expression is computed for determining an estimated nugget diameter on a basis of an inter-electrode displacement integration value calculated by integrating the inter-electrode displacement due to the thermal expansion during a conduction of a welding current, a welding current value, a current conducting time and a welding pressure, while searching a statistical model on a basis of multivariate data to estimate the actual weld nugget diameter, such that $$y=b0+b1x1+b2x2+b3x3+b4x4 \text{ and}$$

$$Yi=a+byi+e,$$

where y: estimated nugget diameter
x1: inter-electrode displacement integration value
x2: welding current
x3: current conducting time
x4: welding pressure
Yi: i-th measured nugget diameter
yi: i-th estimated nugget diameter
a: intercept
b: b0 to b4: regression coefficients
e: error.

30. The method as claimed in claim 29, further comprising the steps of:

holding a maximum displacement just before an occurrence of a spattering, as the spattering has occurred during a welding;

setting a base point when welding plates restart thermally expanding with a continued welding current;

adding a relative displacement from the base point to the maximum displacement so that an inter-electrode displacement after the occurrence of the spattering is corrected;

calculating an inter-electrode displacement integration based on the corrected inter-electrode displacement; and computing the regression expression by using the inter-electrode displacement integration.

31. A method of estimating a nugget diameter in a spot welding, the method comprising the step of:

estimating an actual weld nugget diameter by integrating an inter-electrode displacement due to a thermal shrinkage after a finish of a conduction of a welding current, wherein the integration process of the inter-electrode displacement due to the thermal shrinkage is performed within an integration interval defined by a combination of an integration start point and an integration end point, the integration start point is one of:

an integration start point determined as a finish point of a current conduction;

an integration start point determined as a point after a finish of a current conduction, where the inter-electrode displacement reaches or exceeds a predetermined lever; and an integration start point determined as a point where a predetermined period of time has elapsed from a finish of a current conduction, and the integration end point is one of:

an integration end point determined in advance on basis of the welding conditions;

an integration end point determined as a point where a predetermined period of time has elapsed from the integration start point;

an integration end point determined as a point where a thermal expansion rate based on the inter-electrode displacement during a current conduction becomes a 0; and an integration end point determined as a point where a predetermined period of time has elapsed from a finish of a current conduction, and a regression expression is computed for determining an estimated nugget diameter on a basis of an inter-electrode displacement integration value calculated by integrating the inter-electrode displacement due to the thermal shrinkage after a finish of conduction of a welding current, a welding current, a current conducting time and a welding pressure, while searching a statistical model on a basis of multivariate data to estimate the actual weld nugget diameter, such that $$y=b0+b1x1+b2x2+b3x3+b4x4 \text{ and}$$

$$Yi=a+byi+e,$$

where y: estimated nugget diameter
x1: inter-electrode displacement integration value
x2: welding current
x3: current conducting time
x4: welding pressure
Yi: i-th measured nugget diameter
yi: i-th estimated nugget diameter
a: intercept
b: b0 to b4: regression coefficients
e: error.

32. The method as claimed in claim 31, further comprising the steps of:

sampling an inter-electrode displacement after an occurrence of a spattering during a welding, until a changing rate of the inter-electrode displacement due to the thermal shrinkage after a finish of a current conduction becomes a zero;

adding an absolute value of a relative displacement between an inter-electrode displacement when a changing rate of the inter-electrode displacement due to the thermal shrinkage after the finish of the current conduction has become the zero and a reference point of an inter-electrode displacement before a start of the current conduction to the data sampled after the occurrence of the spattering so that the inter-electrode displacement after the occurrence of the spattering is corrected;

calculating an inter-electrode displacement integration based on the corrected inter-electrode displacement; and computing the regression expression by using the inter-electrode displacement integration.

33. A method of estimating a nugget diameter in a spot welding, the method comprising the step of estimating an actual weld nugget diameter by an integration of an inter-electrode displacement due to a thermal expansion during a conduction of a welding current, wherein the integration of the inter-electrode displacement due to the thermal expansion is performed within an integration interval defined by a combination of an integration start point and an integration end point, the integration start point is one of:

an integration start point determined in advance on basis of welding conditions;

an integration start point determined as a point during a current conduction, where the inter-electrode displacement reaches or exceeds a predetermined level; and an integration start point determined as a point where a predetermined period of time has elapsed from a start of a current conduction, and the integration end point is one of:

an integration end point determined in advance on basis of the welding conditions;

an integration end point determined as a point during or after a current conduction, where the inter-electrode displacement, as it has once exceeded a maximum value, decreases to or exceeds a predetermined level;

an integration end point determined as a point where a predetermined period of time has elapsed from the integration start point;

an integration end point determined as a point where a thermal expansion rate based on the inter-electrode displacement during a current conduction becomes a 0; and an integration end point determined as a point where a predetermined period of time has elapsed from a start of a current conduction, and a regression expression is computed for determining an estimated nugget diameter on a basis of an inter-electrode displacement integration value calculated by integrating the inter-electrode displacement due to the thermal expansion during a conduction of a welding current, and a thickness, a material, a joining type and a surface preparation of welding plates, while searching a statistical model on a basis of multivariate data to estimate the actual weld nugget diameter; and the regression expression, such that $y = b0 + b1x1 + b2x2 + b3x3 + b4x4 + b5x5$ and $Yi = a + byi + e$, where y: estimated nugget diameter
x1: inter-electrode displacement integration value
x2: welding plate thickness
x3: welding plate material
x4: welding plate joining type
x5: welding plate surface preparation
Yi: i-th measured nugget diameter
yi: i-th estimated nugget diameter
a: intercept
b: b0 to b5: regression coefficients
e: error.

34. A method of estimating a nugget diameter in a spot welding, the method comprising the step of:

estimating an actual weld nugget diameter by an integration of an inter-electrode displacement due to a thermal expansion during a conduction of a welding current, wherein the integration of the inter-electrode displacement due to the thermal expansion is performed within an integration interval defined by a combination of an integration start point and an integration end point, the integration start point is one of:

an integration start point determined in advance on basis of welding conditions;

an integration start point determined as a point during a current conduction, where the inter-electrode displacement reaches or exceeds a predetermined level; and an integration start point determined as a point where a predetermined period of time has elapsed from a start of a current conduction, and the integration start point is one of:

an integration end point determined in advance on basis of the welding conditions;

an integration end point determined as a point during or after a current conduction, where the inter-electrode displacement as it has once exceeded a maximum value, decreases to or exceeds a predetermined level;

an integration end point determined as a point where a predetermined period of time has elapsed from the integration start point;

an integration end point determined as a point where a thermal expansion rate based on the inter-electrode displacement during a current conduction becomes a 0; and an integration end point determined as a point where a predetermined period of time has elapsed from a start of a current conduction, and a regression expression is computed for determining an estimated nugget diameter on a basis of an inter-electrode displacement integration value calculated by integrating the inter-electrode displacement due to the thermal shrinkage after a finish of conduction of a welding current, and a thickness, a material, a joining type and a surface preparation of welding plates, while searching a statistical model on a basis of multivariate data to estimate the actual weld nugget diameter; and the regression expression is, such that $y = b0 + b1x1 + b2x2 + b3x3 + b4x4 + b5x5$ and $Yi = a + byi + e$, where y: estimated nugget diameter
x1: inter-electrode displacement integration value
x2: welding plate thickness
x3: welding plate material
x4: welding plate joining type
x5: welding plate surface preparation
Yi: i-th measured nugget diameter yi: i-th estimated nugget diameter
a: intercept
b, b0 to b5: regression coefficients
e: error.

35. A method of estimating a nugget diameter in a spot welding, the method comprising the step of:

estimating an actual weld nugget diameter by an integration of an inter-electrode displacement due to a thermal expansion during a conduction of a welding current, wherein the integration of the inter-electrode displacement due to the thermal expansion is performed within an integration interval defined by a combination of an integration start point and an integration end point, the integration start point is one of:

an integration start point determined in advance on basis of welding conditions;

an integration start point determined as a point during a current conduction, where the inter-electrode displacement reaches or exceeds a predetermined level; and an integration start point determined as a point where a predetermined period of time has elapsed from a start of a current conduction, and the integration end point is one of:

an integration end point determined in advance on basis of the welding conditions;

an integration end point determined as a point during or after a current conduction, where the inter-electrode displacement, as it has once exceeded a maximum value, decreases to or exceeds a predetermined level;

an integration end point determined as a point where a predetermined period of time has elapsed from the integration start point;

an integration end point determined as a point where a thermal expansion rate based on the inter-electrode displacement during a current conduction becomes a 0; and an integration end point determined as a point where a predetermined period of time has elapsed from a start of a current conduction, and a correction coefficient is calculated from an inter-electrode displacement integration value associated with the thermal expansion during a conduction of a welding current and an inter-electrode displacement integration value associated with the thermal shrinkage after a finish of conduction of a welding current, such that the correction coefficient =(the inter-electrode displacement integration value associated with the thermal shrinkage)/(the inter-electrode displacement integration value associated with the thermal expansion), and the inter-electrode displacement integration value associated with the thermal expansion is multiplied by the correction coefficient to correct an attenuation of an inter-electrode displacement due to an electrode tip contact area.

36. A system for estimating a nugget size of a welding spot, the system comprising:

a spot welder for holding a welding spot between electrodes under pressure, detecting an inter-electrode displacement therebetween, and conducting a welding current through the welding spot;

a spattering detector for detecting a spattering occurred at the welding spot;

a first selector for selecting a first value of the inter-electrode displacement detected before the spattering;

a second selector for selecting a second value of the inter-electrode displacement detected after the spattering, the second value being different from the first value;

a corrector for correcting detected values of the inter-electrode displacement after the spattering, depending on a difference between the first and second values;

an integrator for integrating detected values of the inter-electrode displacement, using corrected values thereof as applicable, to make a time integration of the inter-electrode displacement; and an estimator for estimating a nugget size of the welding spot on a basis of the time integration.

37. A method of estimating a nugget size in a spot welding, the method comprising:

holding a welding spot between electrodes under pressure, detecting an inter-electrode displacement therebetween;

conducting a welding current through the welding spot;

detecting a spattering occurred at the welding spot;

selecting a first value of the inter-electrode displacement detected before the spattering;

selecting a second value of the inter-electrode displacement detected after the spattering, the second value being different from the first value;

correcting detected values of the inter-electrode displacement after the spattering, depending on a difference between the first and second values;

integrating detected values of the inter-electrode displacement, using corrected values thereof as applicable, to make a time integration of the inter-electrode displacement; and estimating a nugget size of the welding spot on a basis of the time integration.

* * * * *